United States Patent
Hsieh et al.

(10) Patent No.: US 6,738,256 B2
(45) Date of Patent: May 18, 2004

(54) HEAT SINK ATTACHED EXTERNALLY ON BOTTOM PORTION OF PORTABLE COMPUTER

(75) Inventors: Chen-Huang Hsieh, No. 174, Heyi Rd., Heping Island, Keelung City (TW); Shu-Jen Chen, Keelung (TW)

(73) Assignee: Chen-huang Hsieh

( * ) Notice: Subject to any disclaimer, the term of this patent is extended or adjusted under 35 U.S.C. 154(b) by 16 days.

(21) Appl. No.: 10/237,694

(22) Filed: Sep. 10, 2002

(65) Prior Publication Data

US 2004/0047124 A1 Mar. 11, 2004

(51) Int. Cl.[7] .................................................. G06F 1/20
(52) U.S. Cl. ...................... 361/687; 361/683; 361/686; 361/695; 165/121; 454/184
(58) Field of Search .................................. 361/679, 683, 361/685–687, 692–695, 697, 688; 165/104.33, 80.2, 80.3, 121–127, 165, 185; 454/184; 174/15.1, 15.2, 16.1, 16.3

(56) References Cited

U.S. PATENT DOCUMENTS 6,219,233 B1 * 4/2001 Moore et al. ................ 361/687
6,239,971 B1 * 5/2001 Yu et al. ...................... 361/695
6,515,856 B2 * 2/2003 Hidesawa ................... 361/687

FOREIGN PATENT DOCUMENTS

| JP | 02000293270 A | * 10/2000 | ............ G06F/1/20 |
| JP | 02001306186 A | * 11/2001 | ............ G06F/1/20 |
| JP | 02001345588 A | * 12/2001 | ............ H05K/7/20 |
| JP | 02002215271 A | * 7/2002  | ............ G06F/1/20 |

OTHER PUBLICATIONS

Usui et al, U.S. patent application Publication US 2001/0030851A1.*
Kitahara, U.S. patent application Publication US 2002/0105783A1.*

* cited by examiner

*Primary Examiner*—Michael Datskovsky

(57) ABSTRACT

A heat sink attached externally on a bottom portion of a portable computer has the heat sink placed at a rear lower aspect of the portable computer; the present invention is characterized that the heat sink is a flat casing; at least one fan is installed inside the heat sink; an air inlet is disposed at the upper aspect of the fan; an air outlet is disposed at the front aspect of a bearing plate on the front aspect of the fan; a current guide board is disposed at the lower aspect of the fan; according to the abovementioned structure, when being used, the air current enters from the air inlet and discharges outwardly from the air outlet thereby allowing the cooling air current to enter from the bottom portion of the portable computer for heat dissipation.

8 Claims, 12 Drawing Sheets

HEAT SINK ATTACHED EXTERNALLY ON BOTTOM PORTION OF PORTABLE COMPUTER

BACKGROUND OF THE INVENTION

1) Field of the Invention

The present invention relates to a heat sink attached externally on a bottom portion of a portable computer, more particularly to a heat sink structure capable of affixing a rear end of the portable computer to the heat sink located on the bottom portion thereof thereby lifting said rear end upwardly and conducting heat dissipation via the heat sink on the bottom portion thereof.

2) Description of the Prior Art

Accordingly, in order to make a portable computer with a small and thin volume, an inner space thereof is usually very narrow. Since the usable space therein has been utilized sufficiently, the space for heat dissipation is even smaller; furthermore, almost all the heat generated from the interior portion of the portable computer is dissipated through an external metal casing thereof. However, the heat dissipation achieved only by exchanging heat between the external metal casing and the atmospheric air is not very effective and that is unable to enhance the heat dissipation efficiency of the portable computer.

Therefore, some of the industrials placed a heat sink on a bottom portion of a portable computer, as shown in FIGS. 11 & 12; the heat sink on the bottom portion blows the cool air current to the bottom portion of the portable computer for enhancing the heat dissipation effect thereof. In a conventional and portable computer, the heat sink located on the bottom portion thereof has a flat casing (a) with a plurality of fans (b) installed therein; a padding block (a1) is disposed at the rear aspect of the flat casing (a) for placing the portable computer (c) at the upper aspect of the flat casing (a) and affixing the padding block (a1) at the rear aspect thereof to the rear bottom plane of the portable computer (c) for lifting the rear aspect thereof upwardly thereby forming a wedge-shaped space (d) between the portable computer (c) and the flat casing (a). Therefore, the cool air current is guided inwardly through the two sides of the wedge-shaped space (d) via the fan (b) and discharged outwardly from the air outlet (a2) at the rear aspect of the flat casing (a) so as to conduct heat dissipation through the bottom portion of the portable computer (c).

After the portable computer (c) is placed at the upper aspect of the flat casing (a), the entire height (h) formed by the height (h1) of the flat casing (a) and the thickness of the portable computer (c) is too high for a user to operate conveniently.

In addition, since the height of the padding block (a1) at the rear aspect of the flat casing (a) is fixed, the degree of inclination of the portable computer (c) can't be adjusted by the user habitually and freely.

Furthermore, since the height of the padding block (a1) at the rear aspect of the flat casing (a) is fixed, after the portable computer (c) is placed at the upper aspect of the flat casing (a), the wedge-shaped space (d) formed between the flat casing (a) and the portable computer (c) is narrower such that the cool air current guided in through the two sides of the wedge-shaped space (d) is limited. Therefore, the achieved effect is not preferred to effectively enhance the heat dissipation efficiency.

In view of the abovementioned drawbacks of the heat sink placed on the bottom portion of the conventional and portable computer for enhancing the heat dissipation efficiency, the inventor of the present invention has designed a heat sink attached externally on a bottom portion of a portable computer.

SUMMARY OF THE INVENTION

The present invention comprising a heat sink placed at a rear lower aspect of a portable computer is characterized that the heat sink is a flat casing assembled by an upper and a lower casings; the front aspect of the heat sink extends to form a bearing plate; at least one fan is installed inside the heat sink; on the upper aspect of the heat sink, an air inlet is disposed at the upper aspect of the fan; an air outlet is disposed at the front aspect of the bearing plate; a current guide board is disposed at the lower aspect of the fan in the heat sink; according to the abovementioned structure, the bearing plate affixes to the rear bottom plane of the portable computer such that through the fan, the air current enters from the air inlet and discharges outwardly from the air outlet at the front aspect of the bearing plate thereby allowing the cooling air current to enter from the bottom portion of the portable computer for achieving a heat dissipation effect.

Therefore, the primary objective of the present invention is to provide a heat sink structure that allows the rear end of the portable computer affix to the heat sink located on the bottom portion thereof to lift the rear end thereof upwardly for conducting heat dissipation via the heat sink on the bottom portion thereof.

To enable a further understanding of the structural features and the technical contents of the present invention, the brief description of the drawings below is followed by the detailed description of the preferred embodiment.

DETAILED DESCRIPTION OF THE PREFERRED EMBODIMENTS

Figure 1:
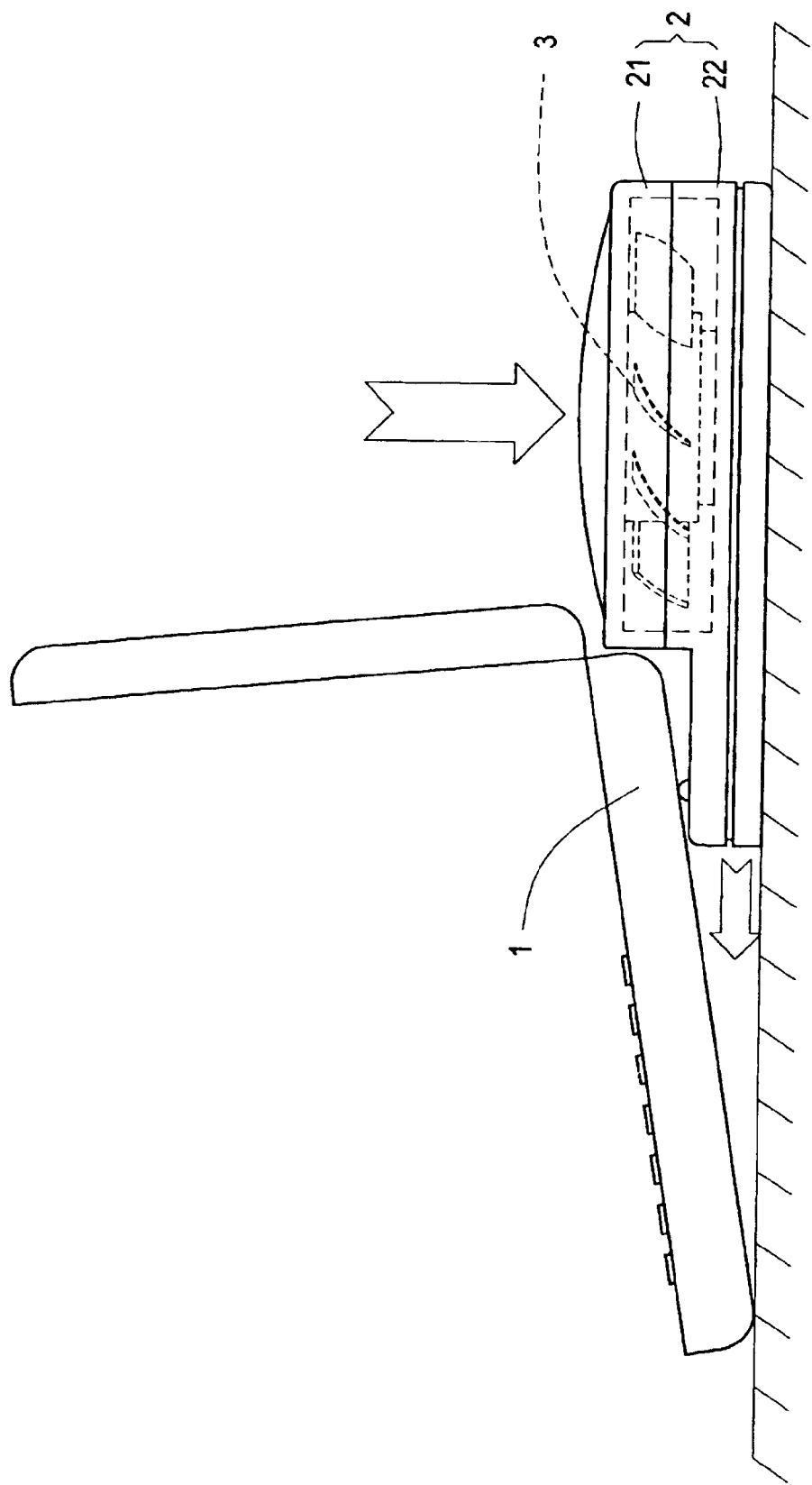
FIG. 1 is a lateral view drawing of the application of the present invention.
Figure 2:
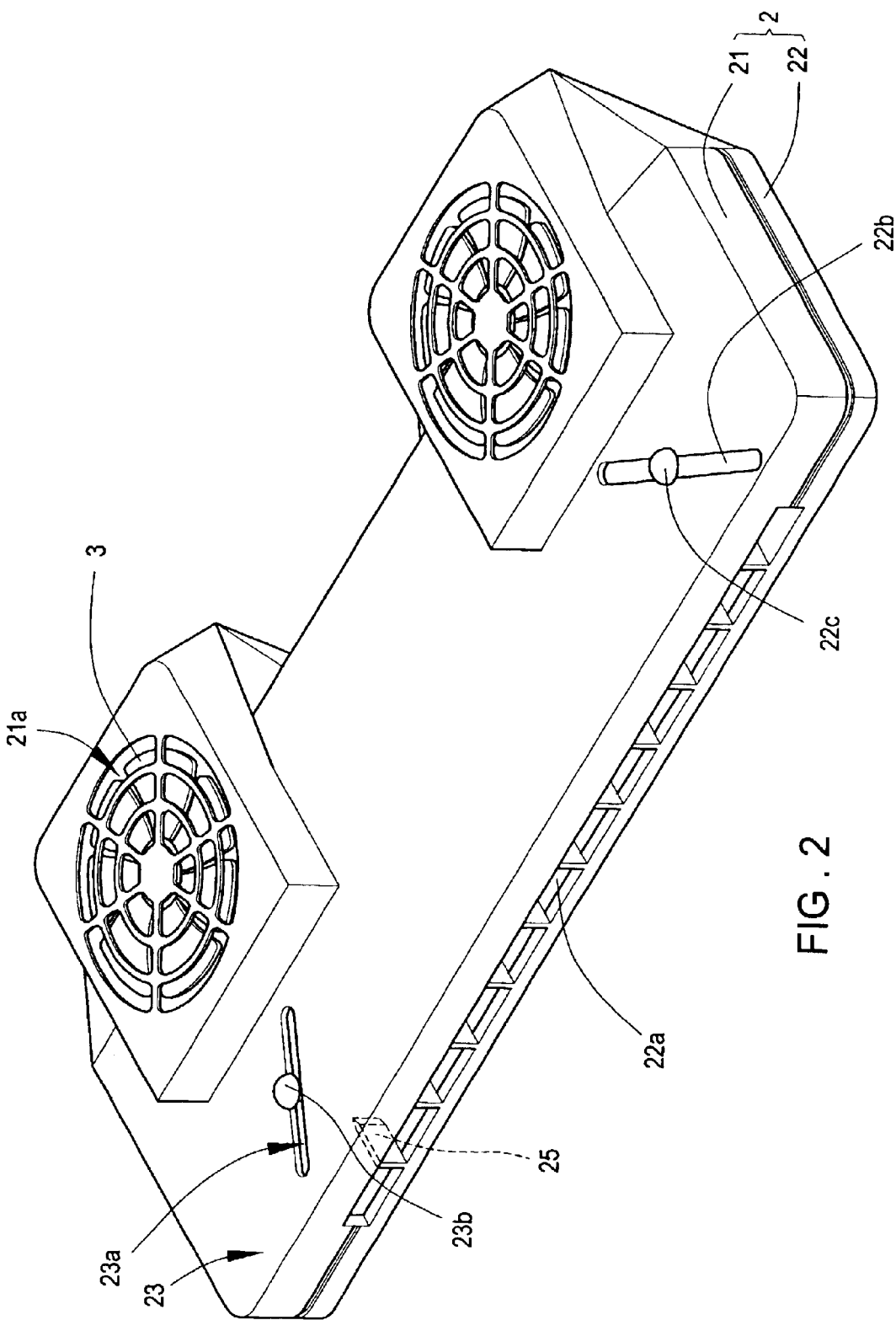
FIG. 2 is a pictorial drawing of the present invention.
Figure 3:
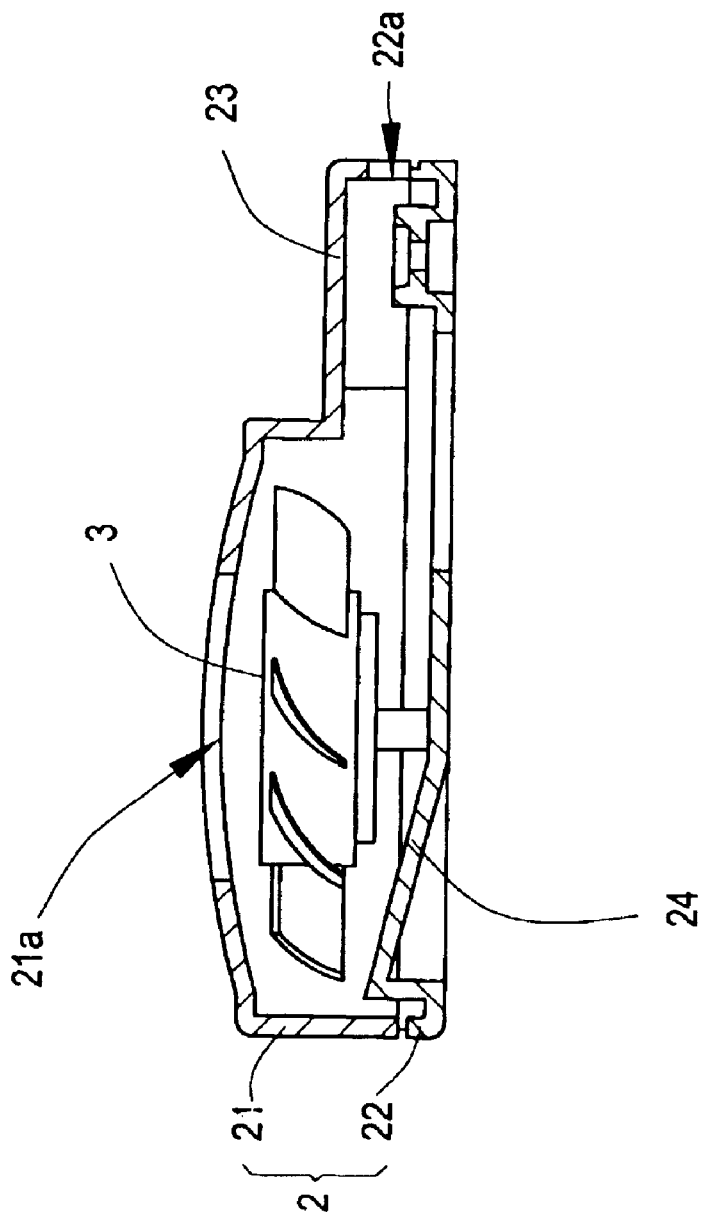
FIG. 3 is a cross-sectional drawing of the assembly of the present invention.

Referring to FIGS. 1 and 2, the present invention comprising a heat sink (2) placed at a rear lower aspect of a portable computer (1) is characterized that the heat sink (2) is a flat casing assembled by an upper and a lower casings (21, 22); the front aspect of the heat sink (2) extends to form a bearing plate (23); at least one fan (3) is installed inside the heat sink (2); on the upper aspect of the heat sink (2), an air inlet (21a) is disposed at the upper aspect of the fan (3); an air outlet (22a) is disposed at the front aspect of the bearing plate (23); a current guide board (24) is disposed at the lower aspect of the fan (3) in the heat sink (2), as shown in FIG. 3. Therefore, the bearing plate (23) affixes to the rear bottom plane of the portable computer (1) such that through the fan (3), the air current enters from the air inlet (21a) and discharges outwardly from the air outlet (22a) at the front aspect of the bearing plate (23) thereby allowing the cooling air current to enter from the bottom portion of the portable computer (1) for achieving a heat dissipation effect.

According to the abovementioned structure, the front aspect of the heat sink (2) extends to form the bearing plate (23) thereby making the rear aspect of the portable computer (1) affix onto the bearing plate (23) for lifting the rear end of the portable computer (1) upwardly; furthermore, the fan (3) is respectively installed on the inner portions on the two sides of the heat sink (2) to guide in the cool air current through the air inlet (21a) at the upper aspect of the heat sink (2); the cool air current is then discharged through the air outlet (22a) at the front aspect of the bearing plate (23). Therefore, the cool air current is guided into the bottom portion of the portable computer (1) for conducting heat dissipation.

Since the fans (3) used for guiding in the cool air current are located on the inner portions of the two sides of the heat sink (2), the heat sink (2) is placed on the outer portion at the rear aspect of the portable computer (1) but not directly at the lower aspect thereof. So, when guiding in the air current, the fan (3) has more guide-in space; furthermore, the air current is led from a current guide board (24) located inside the heat sink (2) to the air outlet (22a) at the front aspect of the bearing plate (23) for discharge. Therefore, the cool air current spreads over the entire bottom plane of the portable computer (1) so as to achieve more effective heat dissipation.

Referring to FIG. 2, a wind guide board (25) is installed on the air outlet (22a) of the heat sink (2) for evenly distributing the air current on the bottom portion of the portable computer (1) for enhancing the heat dissipation effect.

Figure 4:
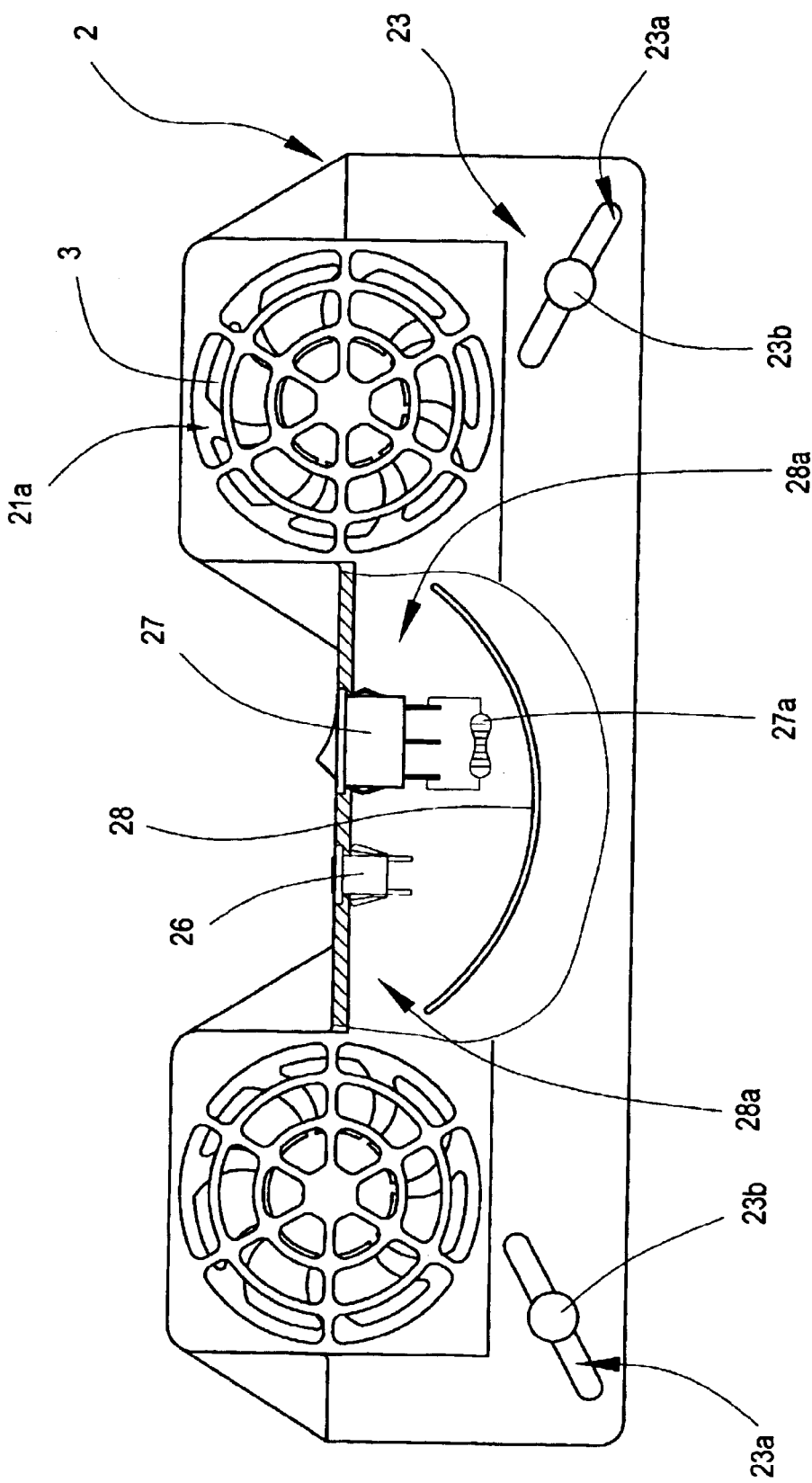
FIG. 4 is a bottom view and cross-sectional drawing of the assembly of the present invention.

Referring to FIG. 4, a power source receptacle (26) and a switch (27) are disposed on the intermediate portion at the rear aspect of the heat sink (2); the switch (27) connects with an electric resistance (27a) for adjusting the wind speed in a bridge-joint; a dividing board (28) is disposed at the front aspects of the power source receptacle (26) and the switch (27). The function of the dividing board (28) is to prevent the exposure of the electric wire. Two notches (28a) at two ends of the dividing board (28) are capable of leading the fan (3) to suck in the cool air for reducing the temperature of the built-in electric resistance (27a) for preventing exceeded temperature.

Figure 5:
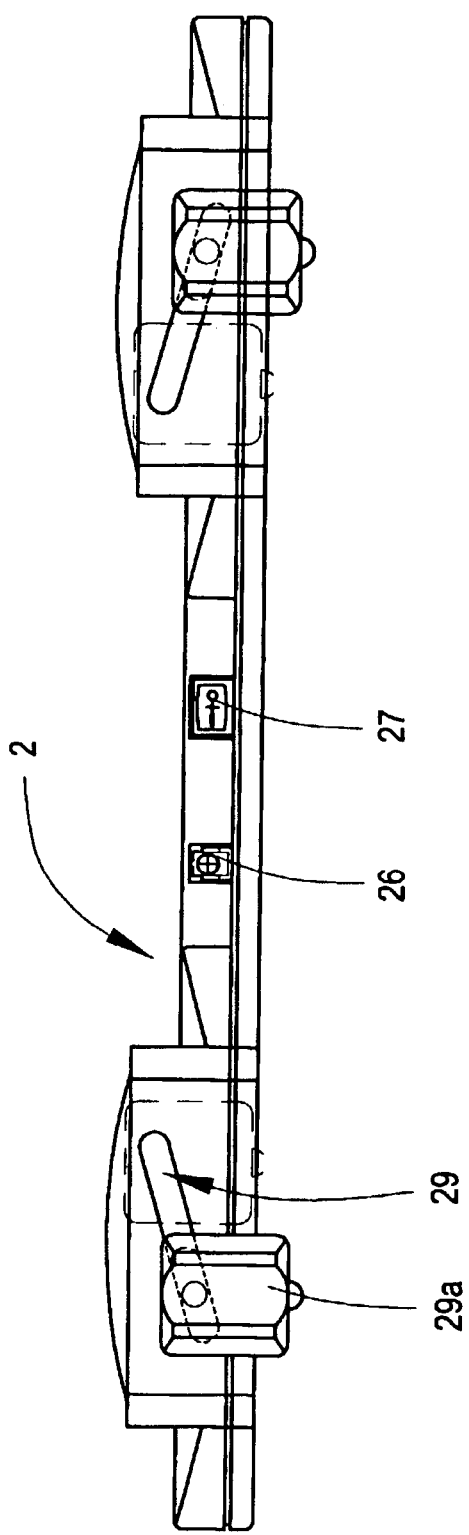
FIG. 5 is a rear view drawing of the present invention.

Referring to FIG. 5, a slant guide slot (29) is disposed respectively on two left and right sides at the rear aspect of the heat sink (2); a movable pad (29a) is disposed on the slant guide slot (29) for adjusting a proper degree of a forward inclination of the heat sink (2) according to a user's need for conveniently operating the portable computer (1).

Figure 6:
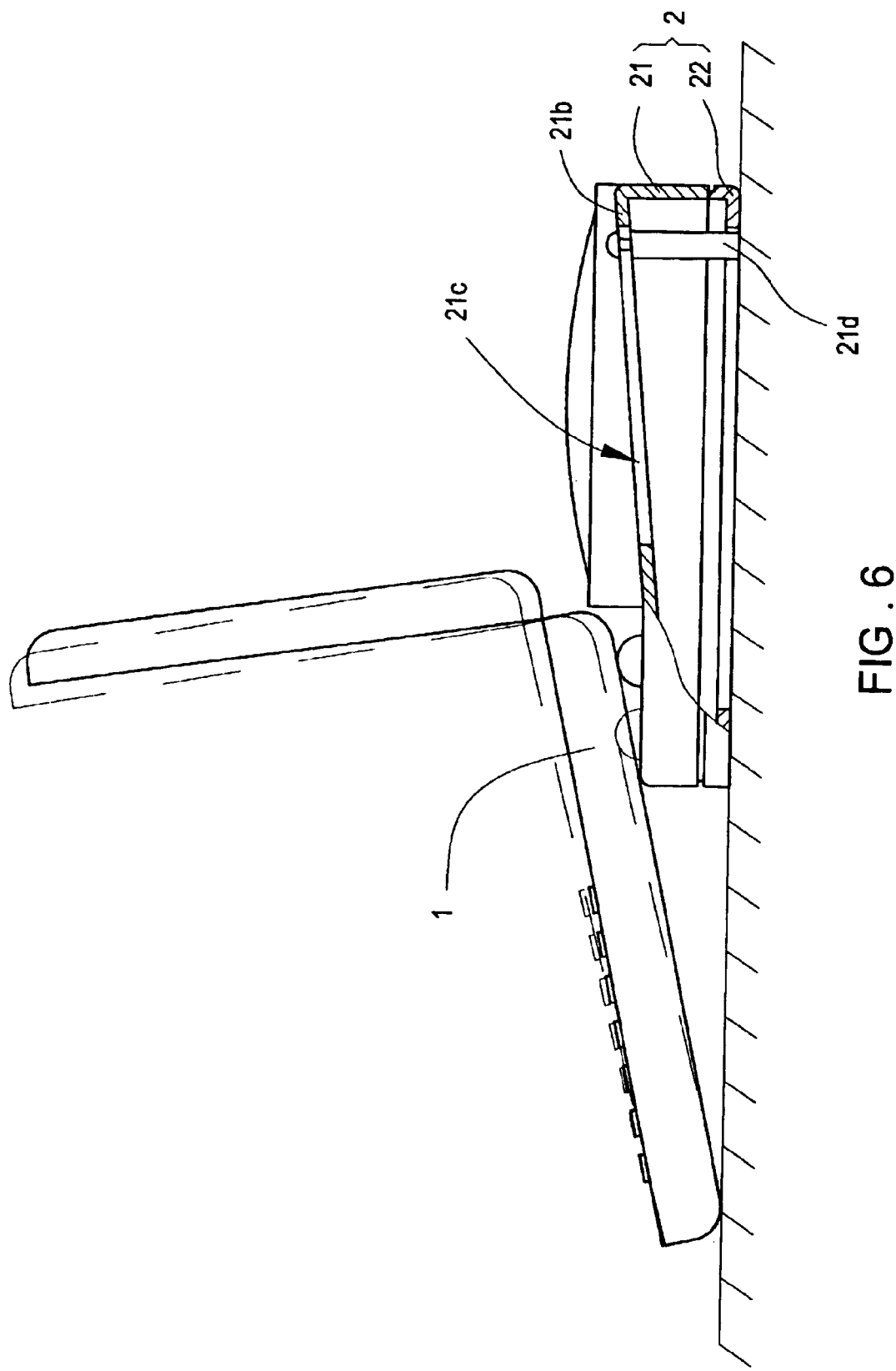
FIG. 6 is a lateral drawing of another exemplary embodiment of the present invention.
Figure 7:
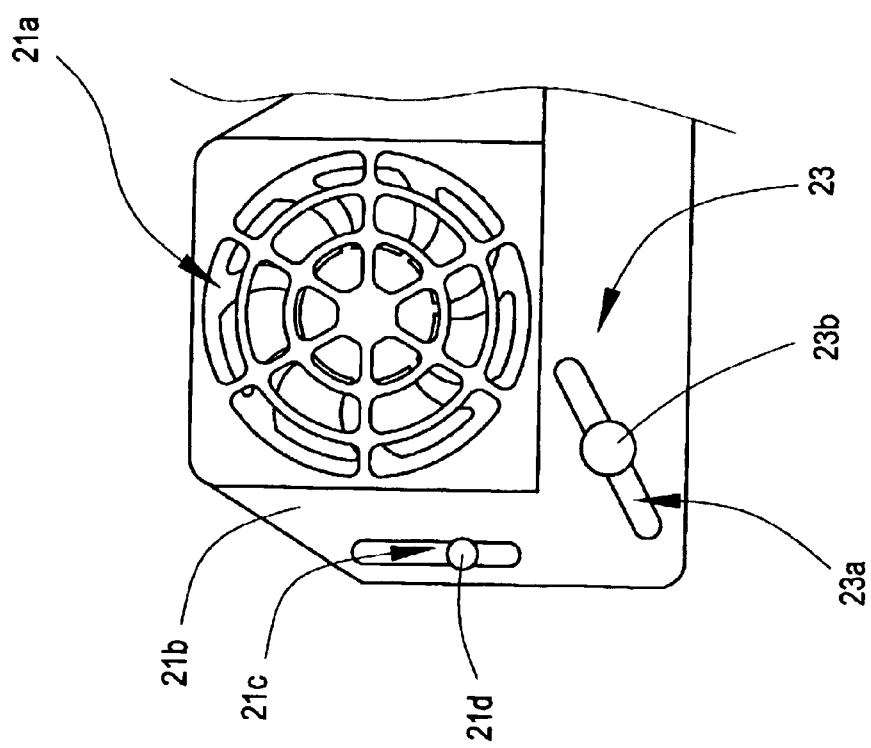
FIG. 7 is a bottom view drawing of a part of FIG. 6.

Referring to FIGS. 6 and 7, a slant plane (21b) is respectively disposed on two left and right sides at the rear aspect of the upper casing (21) of the heat sink (2); a guide slot (21c) is disposed on the slant plane (21b); a movable pad (21d) is disposed on the guide slot (21c). As the same, the movable pad (21d) is used to adjust a proper degree of a forward inclination of the heat sink (2) according to a user's need for conveniently operating the portable computer (1). That is another exemplary embodiment of the present invention.

Figure 8:
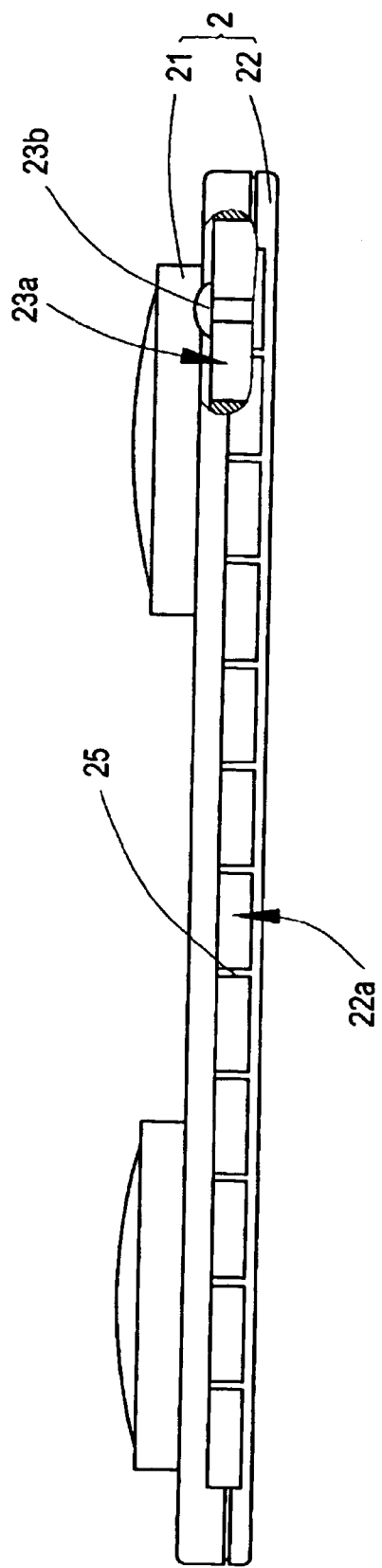
FIG. 8 is a front view drawing of the present invention.

Referring to FIGS. 2 and 8, a slant guide slot (23a) is disposed respectively on two left and right sides of the bearing plate (23) at the front aspect of the heat sink (2); a front pad (23b) is disposed at the slant guide slot (23a). Moving the front pad (23b) adjusts the degree of a forward inclination of the portable computer (1) affixing on the heat sink (2) to achieve the same said objective. That is yet another exemplary embodiment of the present invention.

Figure 9:
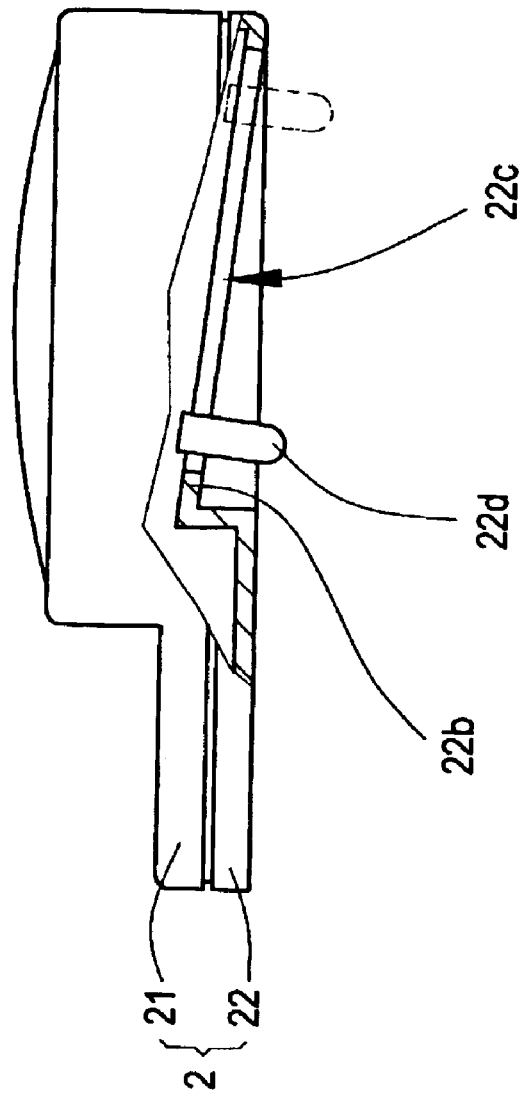
FIG. 9 is a lateral view drawing of yet another exemplary embodiment of the present invention.

Referring to FIG. 9, a bottom slant plane (22b) is respectively disposed at the lower aspects of two left and right sides of the lower casing (22) of the heat sink (2). A slide slot (22c) is disposed on the bottom slant plane (22b) and a foot post (22d) is disposed inside the slide slot (22c). Moving the foot post (22d) slightly adjusts the degree of a forward inclination of the heat sink (2). That is still another exemplary embodiment of the present invention.

Figure 10:
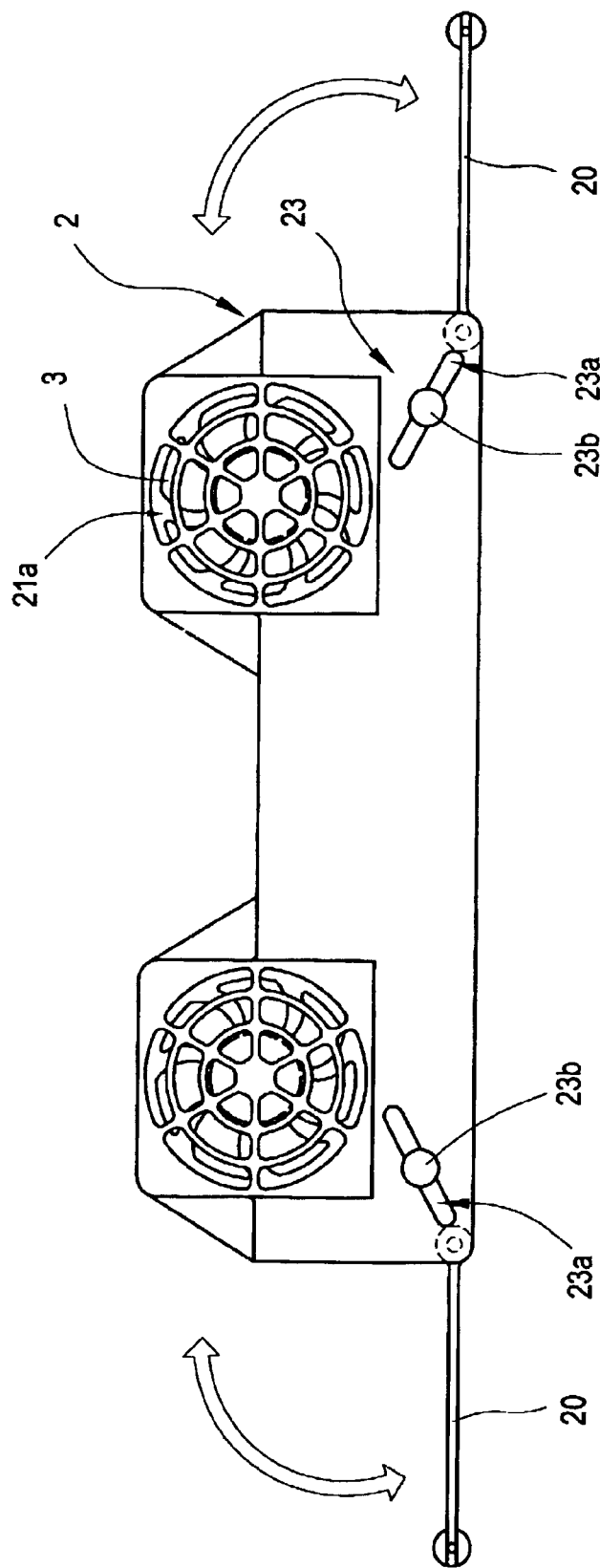
FIG. 10 is a bottom view drawing of still another exemplary embodiment of the preset invention.
Figure 11:
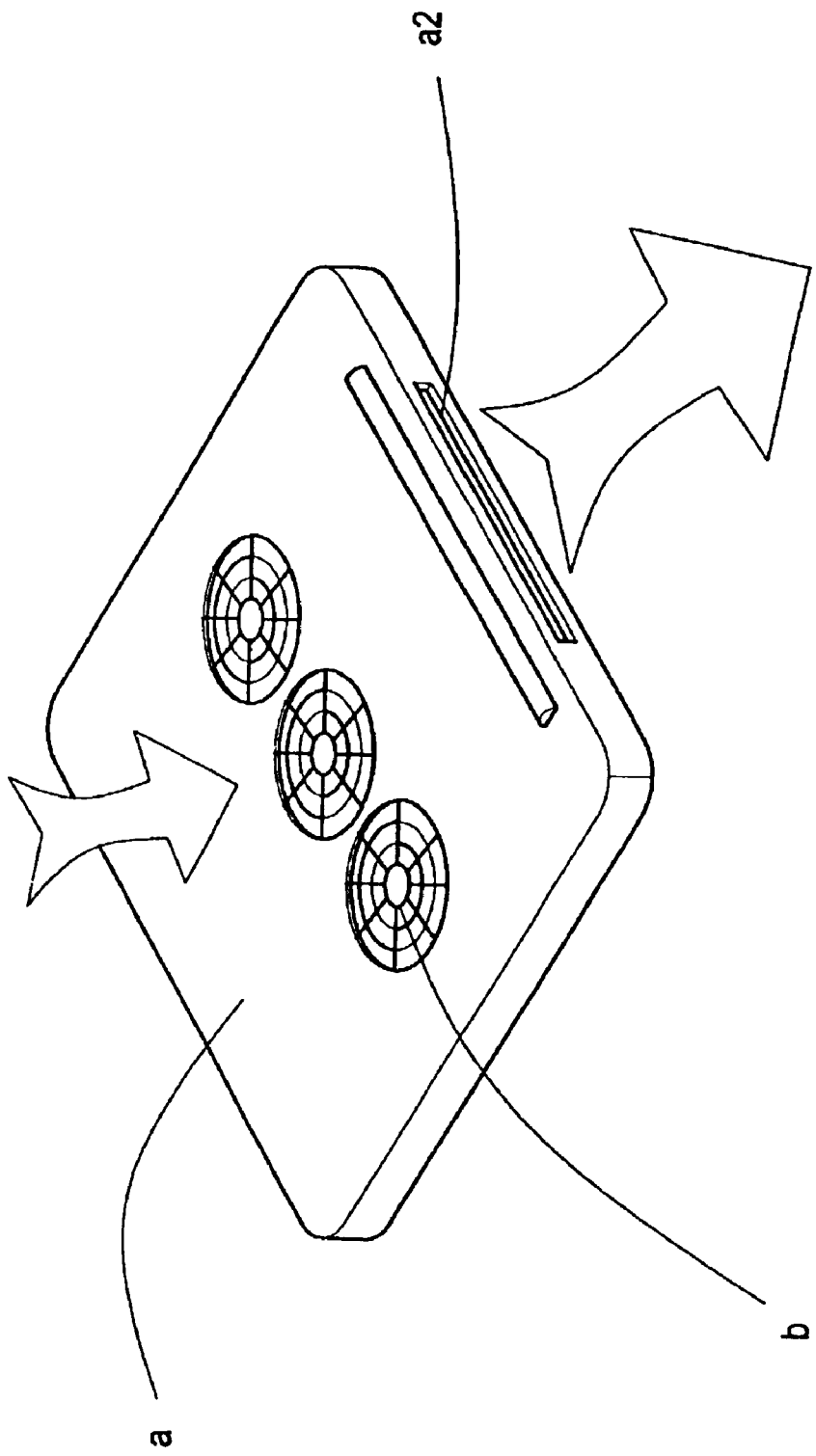
FIG. 11 is a pictorial drawing of a conventional structure.
Figure 12:
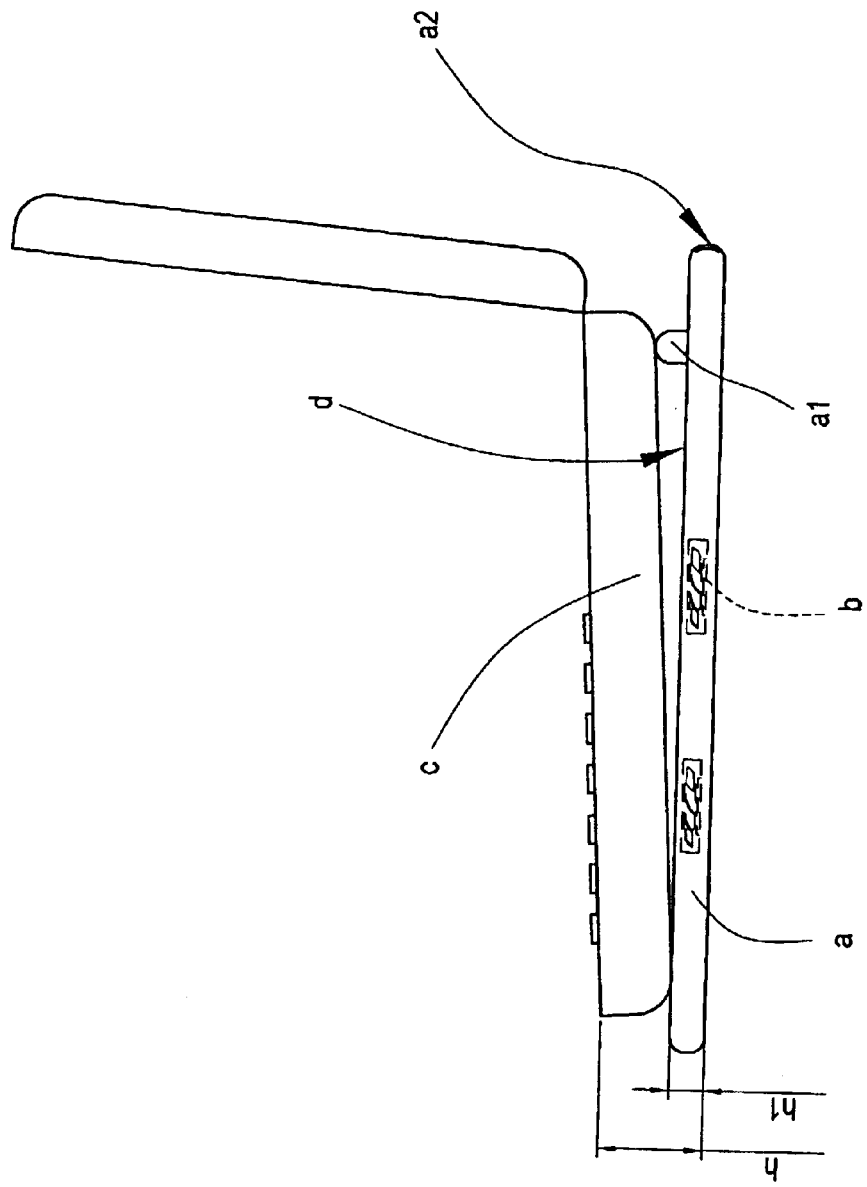
FIG. 12 is a lateral view drawing of the application of the conventional structure.

Referring to FIG. 10, a supporting stand (20) is respectively and pivotally disposed on two left and right sides of the heat sink (2). Rotating the supporting stand (20) outwardly increases the bottom portion area of the heat sink (2) and the steadiness of the placement thereof on a desktop. Reversely, when not in use, the supporting stand (20) is folded for storage on two sides thereby reducing the volume and facilitating the storage.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A heat sink attached externally on a bottom portion of a portable computer comprising the heat sink placed at a rear lower aspect of the portable computer is characterized that:
    the heat sink is a flat casing assembled by an upper and a lower casings; the front aspect of the heat sink extends to form a bearing plate; at least one fan is installed inside the heat sink; on the upper aspect of the heat sink, an air inlet is disposed at the upper aspect of the fan; an air outlet is disposed at the front aspect of the bearing plate; a current guide board is disposed at the lower aspect of the fan in the heat sink; the bearing plate affixes to the rear bottom plane of the portable computer such that through the fan, the air current enters from the air inlet and discharges outwardly from the air outlet at the front aspect of the bearing plate thereby allowing the cooling air current to enter from the bottom portion of the portable computer for achieving a heat dissipation effect.

2. The heat sink attached externally on a bottom portion of a portable computer according to claim 1, wherein a wind guide board is installed on the air outlet of the heat sink for evenly distributing the air current on the bottom portion of the portable computer for enhancing the heat dissipation effect.

3. The heat sink attached externally on a bottom portion of a portable computer according to claim 1, wherein a power source receptacle and a switch are disposed on the intermediate portion at the rear aspect of the heat sink; the switch connects with an electric resistance for adjusting the wind speed in a bridge-joint; a dividing board is disposed at the front aspects of the power source receptacle and the switch.

4. The heat sink attached externally on a bottom portion of a portable computer according to claim 1, wherein a slant guide slot is disposed respectively on two left and right sides at the rear aspect of the heat sink; a movable pad is disposed on the slant guide slot for adjusting a proper degree of a forward inclination of the heat sink according to a user's need for conveniently operating the portable computer.

5. The heat sink attached externally on a bottom portion of a portable computer according to claim 1, wherein a slant plane is respectively disposed on two left and right sides at the rear aspect of the upper casing of the heat sink; a guide slot is disposed on the slant plane; a movable pad is disposed on the guide slot; the movable pad is used to adjust a proper degree of a forward inclination of the heat sink according to a user's need for conveniently operating the portable computer.

6. The heat sink attached externally on a bottom portion of a portable computer according to claim 1, wherein a slant guide slot is disposed respectively on two left and right sides of the bearing plate at the front aspect of the heat sink; a front pad is disposed at the slant guide slot; moving the front pad adjusts the degree of a forward inclination of the portable computer affixing onto the heat sink.

7. The heat sink attached externally on a bottom portion of a portable computer according to claim 1, wherein a bottom slant plane is disposed at the lower aspects of two left and right sides of the lower casing of the heat sink; a slide slot is disposed on the bottom slant plane and a foot post is disposed inside the slide slot; moving the foot post slightly adjusts the degree of a forward inclination of the heat sink.

8. The heat sink attached externally on a bottom portion of a portable computer according to claim 1, wherein a supporting stand is respectively and pivotally disposed on two left and right sides of the heat sink.

* * * * *